Figure 1:
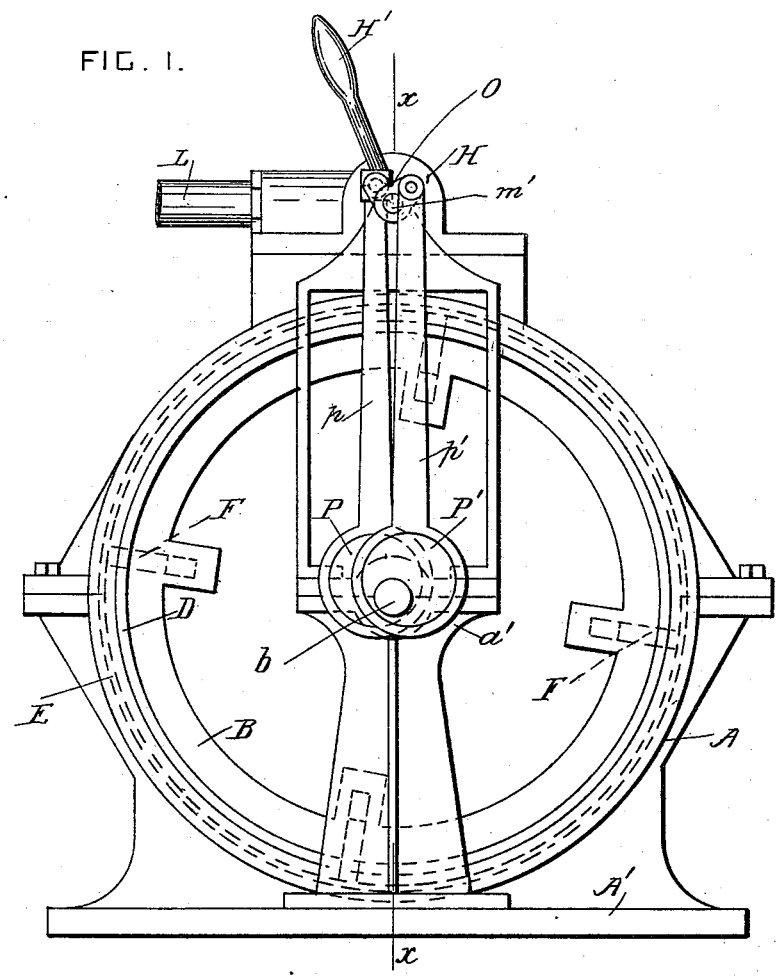

No. 610,497. Patented Sept. 6, 1898.
E. PROBST.
ROTARY ENGINE.
(Application filed Aug. 25, 1897.)
(No Model.) 3 Sheets—Sheet 1.

WITNESSES

INVENTOR
Edward Probst
by Herbert W. Jenner.
Attorney

No. 610,497. Patented Sept. 6, 1898.
E. PROBST.
ROTARY ENGINE.
(Application filed Aug. 25, 1897.)
(No Model.) 3 Sheets—Sheet 2.
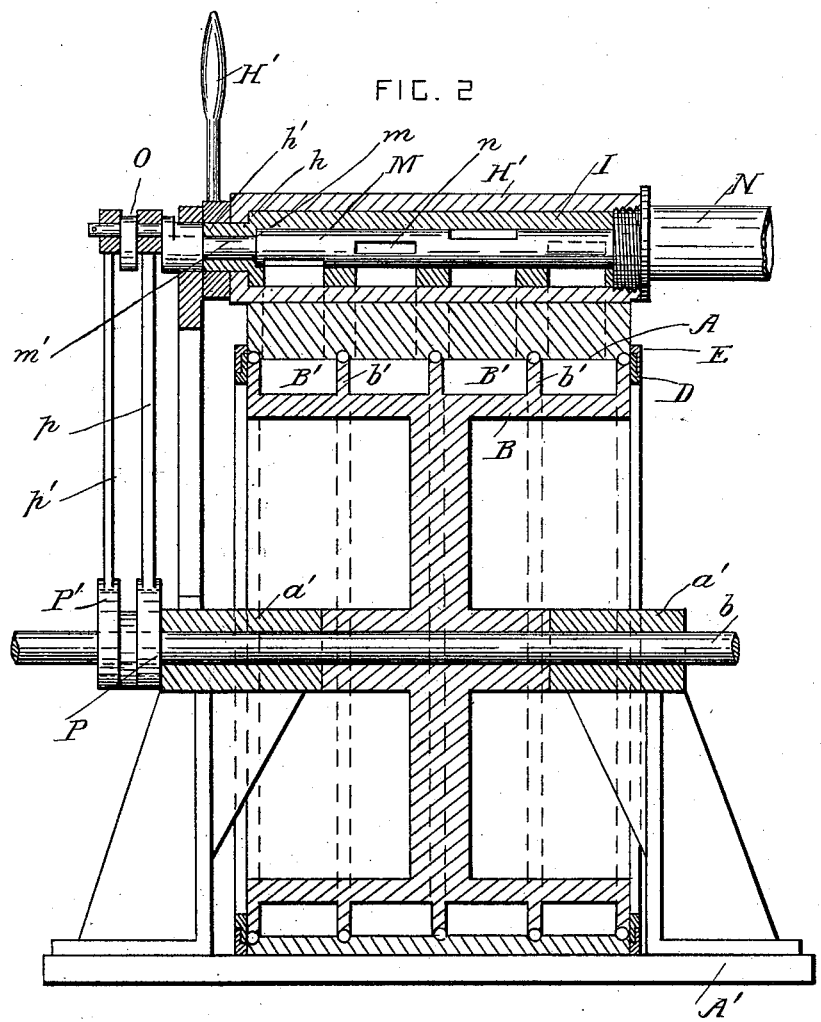
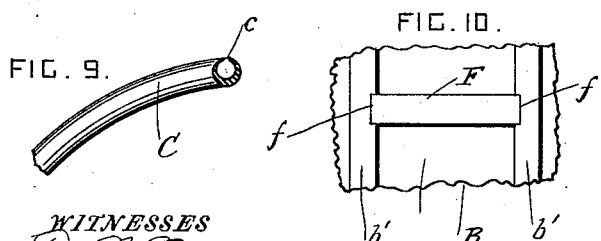
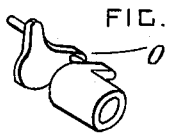
WITNESSES
INVENTOR
Edward Probst
by Herbert W. T. Jenner.
Attorney

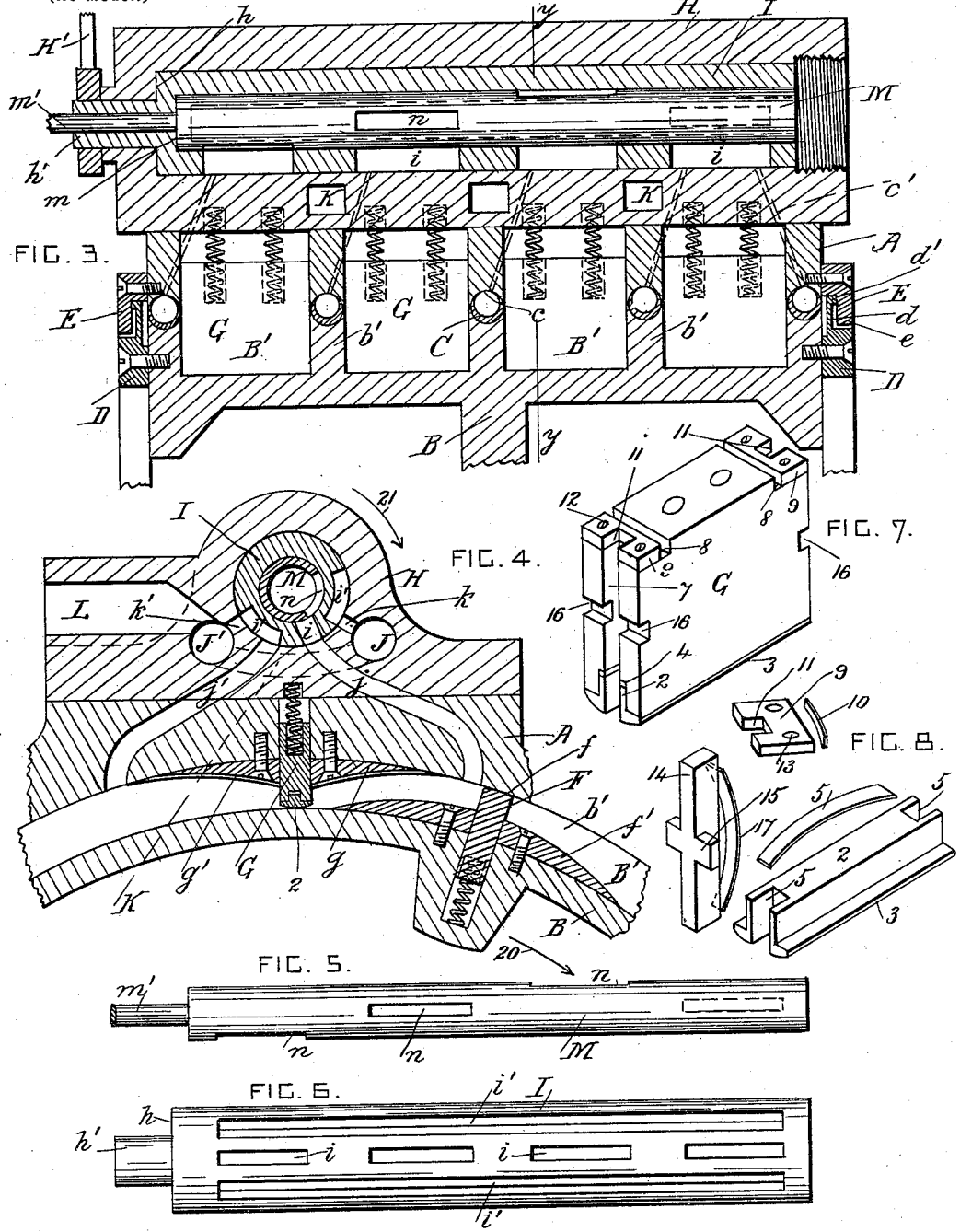

UNITED STATES PATENT OFFICE.

EDWARD PROBST, OF TERRE HAUTE, INDIANA, ASSIGNOR OF TWO-FIFTHS TO WILLIAM H. HOFF, OF SAME PLACE.

ROTARY ENGINE.

SPECIFICATION forming part of Letters Patent No. 610,497, dated September 6, 1898.

Application filed August 25, 1897. Serial No. 649,425. (No model.)

*To all whom it may concern:*

Be it known that I, EDWARD PROBST, a citizen of the United States, residing at Terre Haute, in the county of Vigo and State of Indiana, have invented certain new and useful Improvements in Rotary Engines; and I do hereby declare the following to be a full, clear, and exact description of the invention, such as will enable others skilled in the art to which it appertains to make and use the same.

This invention relates to rotary engines; and it consists in the novel construction and combination of the parts hereinafter fully described and claimed.

In the drawings, Figure 1 is a side view of the rotary engine. Fig. 2 is a vertical section taken on the line $x$ $x$ in Fig. 1. Fig. 3 is a section through the valve, taken on the line $x$ $x$ in Fig. 1, but drawn to a larger scale. Fig. 4 is a cross-section taken on the line $y$ $y$ in Fig. 3. Fig. 5 is a detail view of the distributing-valve. Fig. 6 is a detail view of the reversing-valve. Fig. 7 is a detail view of one of the abutment-plates. Fig. 8 shows details of the packing for the abutment-plate. Fig. 9 is a detail view of a portion of one of the piston packing-rings. Fig. 10 is a detail of one of the piston-plates. Fig. 11 is a detail perspective view of the double crank.

A is the cylinder, which is preferably formed of two halves bolted together and secured to a base-plate A'.

B is the piston, secured on a shaft $b$ and arranged concentric with the cylinder. The piston B is provided with a series of circumferential grooves B', separated from each other by circumferential ribs $b'$. The shaft $b$ is journaled in bearings $a'$, which are secured to the base-plate. The ribs $b'$ are kept steam-tight in the cylinder by means of packing-rings C, which are let into semicircular grooves in the cylinder and in the ribs. The rings C are rifted tubes, the rift or split $c$ being preferably on their outer sides, where the metal is preferably thinner than at their under sides. These packing-rings are preferably formed of steel, and the resiliency of the steel keeps them steam-tight in the grooves of the cylinder to a great extent. The interior of each ring C is supplied with steam by a passage $c'$, leading into it from the steam-supply-valve casing or from any other convenient source from which steam can be obtained. The steam inside the packing-rings expands them laterally, so that they revolve steam-tight in the cylinder.

In order to more fully guard against the leakage of steam past the end ribs of the cylinder, a ring D is secured to each said end rib and is furnished with a spring-flange $d$, having an outwardly-projecting lip $d'$. A ring E is secured to the end of the cylinder and is provided with a rigid flange $e$, against which the lip $d'$ is pressed by the spring-flange $d$. The lip $d'$ runs steam-tight against the flange $e$, and any steam which leaks into the space behind the spring-flange tends to press the lip $d'$ tighter against the flange $e$.

Each groove B' in the piston is provided with a spring-pressed piston-plate F. When the piston is provided with four grooves, the piston-plates are arranged substantially at equal distances apart circumferentially upon the periphery of the piston, each plate being in a separate groove. The ribs $b'$ have radial guide-grooves $f$ for the end portions of the piston-plates to slide in, so that the said plates may slide steam-tight and cannot be displaced circumferentially in the grooves B'. Curved wedges $f'$ are secured in the bottoms of the grooves B', one on each side of each piston-plate F, and extend upward one-half of the depth of the grooves.

G are spring-pressed abutment-plates which are slidable in sockets at the upper part of the cylinder. Curved wedges $g$ are secured to the cylinder in the grooves B', one on each side of each abutment-plate, and extend downward one-half the depth of the said grooves. Each groove B' has a separate abutment-plate, and all the abutment-plates are arranged in line with each other at the top of the cylinder. The wedges $g$ are provided with longitudinal grooves $g'$ in their faces, the use of which will be more fully explained hereinafter.

Each abutment-plate G is provided with a packing-strip 2 on its lower edge. The packing-strip 2 is provided with lateral flanges 3, and its face is convex. The middle portion of the packing-strip 2 is let into a groove 4 in the abutment-plate, and 5 is a spring in the groove 4 for forcing the strip 2 downward.

The strip 2 is provided with vertical grooves 5 in its end portions. The ends of the plate G are provided with vertical grooves 7 in line with the grooves 5 and horizontal cross-grooves 16 at about their middle portions. The upper edges of the plate G are provided with recesses 8, and 9 are plates slidable in the said recesses. Springs 10 are arranged in the recesses 8 for pressing the plates 9 against the ends of the sockets in which the plates G slide. The plates 9 are also provided with vertical grooves 11, arranged in line with the grooves 7 and 5. The plates 9 are attached to the abutment-plate by screws 12, and 13 are slots in the plates 9 for the screws 12 to pass through. Packing-strips 14 are slidable in the grooves 7, 5, and 11 and are provided with projections 15, which engage with the cross-grooves 16 and prevent the packing-strips 14 from sliding vertically in the said grooves. Springs 17 are arranged in the grooves 7 behind the packing-strips 14 and press them against the ends of the sockets and against the ribs of the piston.

H is the valve-casing, secured to the top of the cylinder, and I is the reversing-valve journaled in the valve-casing lengthwise of the axis of the cylinder. The reversing-valve I has a series of similar steam-passages $i$ and two exhaust-cavities $i'$, arranged one on each side of the passages $i$. The end portion $h$ of the valve I forms a steam-tight seat against the valve-casing, and the valve I is provided with a hollow stem $h'$, which projects through the valve-casing.

H' is a handle secured on the stem $h'$ for operating the valve I.

The valve-casing is provided with two series of steam-ports $j$ and $j'$, each piston-groove having a pair of ports $j$ $j'$ leading into it on opposite sides of the abutment-plate which slides in the said piston-groove. The valve-casing is further provided with two exhaust-passages J J', arranged one on each side of the said steam-ports and exhaust-ports $k$ $k'$. K are passages which connect the exhaust-passages J and J', and L is the exhaust-pipe leading into the atmosphere.

M is the rotary steam-distributing valve, consisting of a hollow cylinder journaled inside the reversing-valve. One end $m$ of the valve M forms a steam-tight seat against the end of the valve I, and $m'$ is a stem which projects from the valve M and is journaled in the hollow stem $h'$. The valve M is provided with four steam-ports $n$, one for each groove in the piston. These steam-ports are arranged at equal distances apart circumferentially upon the periphery of the valve M, substantially as shown in Fig. 5.

N is a steam-pipe connected to the valve-casing H and supplying steam to the interior of the rotary valve M.

O is a double crank which is secured on the stem $m'$ for revolving the rotary valve.

P P' are two eccentrics secured on the shaft $b$, and $p$ $p'$ are two eccentric-rods which operatively connect the said eccentrics with the arms of the double crank. The arms of the double crank are preferably set at a right angle to each other, and two eccentrics are used, so that the double crank may be revolved continuously.

The action of the engine is as follows: When the parts are in the positions shown in Figs. 3 and 4, the steam passes through the left-hand steam-port $n$ of the valve M into the left-hand groove B' of the piston by way of the ports $i$ and $j$, pertaining to the said groove. The steam drives the piston in the direction of the arrow 20, and the double crank moves the valve M in the direction of the arrow 21. When the piston has made a quarter-revolution, the steam is cut off by the valve M and is allowed to expand in the said left-hand groove for substantially the remaining three-quarters of a revolution. As soon as the valve M has cut off the steam from the left-hand groove it admits steam to the next adjacent groove in the piston for one-quarter of a revolution, and then cuts it off. The valve M then supplies the third and fourth grooves with steam in a similar manner. Any number of grooves may be provided in the piston provided the number of ports in the steam-distributing valve is correspondingly increased, and any desired degree of expansion may thus be arranged for. The steam is exhausted from the piston-grooves when the piston-plates pass the ports $j'$. The curved wedges operate the piston-plates and abutment-plates as they approach each other, so that they can pass each other without striking. The longitudinal grooves in the said wedges prevent the formation of compression and suction spaces in the piston-grooves between the ports $j'$ and $j$ and the abutment-plates between the said ports. The direction of the revolution of the piston is reversed by turning the reversing-valve, by means of its handle, so that the steam-ports $i$ come opposite the ports $j'$ instead of opposite the ports $j$ and so that the right-hand exhaust-cavity $i'$ connects the ports $j$ and $k$ instead of the left-hand exhaust-cavity connecting the ports $j'$ and $k'$.

What I claim is—

1. In a rotary engine, the combination, with a cylinder, of a piston journaled in the cylinder and provided with a series of circumferential grooves, a series of slidable abutment-plates arranged in line with each other and carried by the cylinder, said abutment-plates being slidable in the said grooves respectively, a series of piston-plates arranged out of line with each other one in each groove of the piston, and a valve operating to admit steam to the grooves of the piston between each pair of slidable plates one after the other, substantially as set forth.

2. In a rotary engine, the combination, with a cylinder provided with a series of pairs of steam and exhaust ports, of a piston journaled in the cylinder and provided with a series of circumferential grooves communicating with the said pairs of ports, a series of slidable abutment-plates arranged in line with each other and carried by the cylinder between the said pairs of ports, said abutment-plates being slidable in the said grooves respectively, a series of piston-plates arranged out of line with each other one in each groove of the piston, and a valve operating to admit steam through the said steam-ports to the said grooves between each pair of slidable plates one after the other, substantially as set forth.

3. In a rotary engine, the combination, with a cylinder, a piston journaled in the cylinder and having a series of circumferential grooves each provided with a slidable piston-plate, and slidable abutment-plates carried by the cylinder, each said abutment-plate being slidable in a separate groove of the said series; of a rotary valve controlling the admission and exhaust of steam to and from the said grooves, and driving mechanism operating to move the said valve in one direction continuously, substantially as set forth.

4. In a rotary engine, the combination, with a cylinder, and a piston journaled therein and provided with circumferential ribs, said ribs and cylinder having meeting semicircular grooves; of packing-rings formed of rifted tubes and operating to keep the said ribs steam-tight, substantially as set forth.

5. In a rotary engine, the combination, with a cylinder, and a piston journaled therein and provided with circumferential ribs, said ribs and cylinder having meeting semicircular grooves; of packing-rings formed of rifted tubes, and means for admitting steam to the interior of the said packing-rings, substantially as set forth.

6. In a rotary engine, the combination, with a cylinder, and a piston journaled therein; of a rigid flange secured to one of the said parts, and a ring secured to the other said part and provided with a spring-flange free to bend laterally and having a lip bearing against the said rigid flange and forming a steam-tight joint, substantially as set forth.

7. In a rotary engine, the combination, with a cylinder, and a piston journaled therein, said parts having meeting semicircular circumferential grooves; of a packing-ring formed of a tube of resilient material provided with a circumferential rift or split and arranged in the said grooves, substantially as set forth.

8. In a rotary engine, the combination, with a cylinder, and a piston journaled in the cylinder and provided with a circumferential groove; of a radially-slidable piston-plate carried by the said piston, a radially-slidable abutment-plate carried by the said cylinder, and wedges secured to the said piston and cylinder on each side of each of the said plates and extending one-half the depth of the said groove, substantially as set forth.

9. In a rotary engine, the combination, with a cylinder, and a piston journaled in the cylinder and provided with a circumferential groove; of a plate carried by one of the said parts and slidable crosswise of the said groove, and curved wedges secured one on each side of the said plate and provided with longitudinal grooves in their faces preventing the formation of compression and suction chambers, substantially as set forth.

10. In a rotary engine, the combination, with a cylinder, of an abutment-plate slidable in a socket in the cylinder and provided with recesses 8 at its upper edges, vertical grooves 7 in its side edges and cross-grooves 16 in the middle parts of its side edges; packing-plates 9 slidable in the recesses 8 and provided with grooves 11; and packing-strips 14 slidable in the grooves 7 and 11 and provided with projections 15 engaging with the grooves 16, substantially as set forth.

11. In a rotary engine, the combination, with a cylinder, of an abutment-plate slidable in a socket in the cylinder and provided with a groove 4 in its lower edge, and vertical grooves 7 and cross-grooves 16 in its side edges; a flanged packing-strip 2 slidable in the groove 4 and provided with grooves 5 in its ends; and packing-strips 14 slidable laterally in the grooves 7 and 5 and provided with projections 15 engaging with the grooves 16, said projections 15 preventing the packing-strips from sliding vertically in their grooves, substantially as set forth.

12. In a rotary engine, the combination, with a cylinder, and a valve-casing provided with a series of pairs of ports $j\,j'$, and two exhaust-ports $k\,k'$ arranged crosswise of the cylinder; of an oscillatory reversing-valve journaled in the said casing and provided with a series of steam-passages $i$ arranged in line with each other, and two exhaust-cavities $i'$ arranged one on each side of the said steam-passages; and a rotary steam-distributing valve consisting of a hollow cylinder journaled in the reversing-valve and provided with a series of steam-ports $n$ arranged out of line with each other in its periphery and communicating with the said passages $i$ respectively and one after another, substantially as set forth.

13. In a rotary engine, the combination, with a cylinder, and a valve-casing provided with a series of pairs of ports $j\,j'$, two exhaust-ports $k\,k'$, and two exhaust-passages J J' arranged crosswise of the cylinder one on each side of the ports $j\,j'$, and passages K arranged between the pairs of ports $j\,j'$ and connecting the passages J J'; of an oscillatory reversing-valve journaled in the said casing and provided with a series of steam-passages $i$ arranged in line with each other, and two exhaust-cavities $i'$ arranged one on each side of the said steam-passages; and a rotary steam-distributing valve consisting of a hollow cylinder journaled in the reversing-valve and provided with steam-ports *n* arranged out of line with each other in its periphery, substantially as set forth.

14. In a rotary engine, the combination, with a valve-casing provided with steam and exhaust ports; of a reversing-valve journaled in the casing and provided with an end portion *h* forming a steam-tight seat against the casing, and a stem projecting through the end of the casing; a hollow steam-distributing valve journaled in the said reversing-valve and provided with an end portion *m* forming a steam-tight seat against the reversing-valve, and a stem projecting through the aforesaid stem; and a steam-pipe connected to the casing at the other ends of the said valves from their stems and admitting steam to the interior of the said distributing-valve, substantially as set forth.

15. In a rotary engine, the combination, with a rotary steam-distributing valve, and a double crank secured to the said valve; of two eccentrics driven by the engine-shaft, and two eccentric-rods operatively connected with the arms of the said double crank, whereby the said valve is driven continuously and in the same direction as the said engine-shaft, substantially as set forth.

In testimony whereof I affix my signature in presence of two witnesses.

EDWARD PROBST.

Witnesses:
  HERBERT W. T. JENNER,
  BERTHA L. DANA.